United States Patent [19]
Nguyen

[11] Patent Number: 4,834,436
[45] Date of Patent: May 30, 1989

[54] MOVABLE GRILL

[75] Inventor: Le C. Nguyen, Sterling Heights, Mich.

[73] Assignee: Ford Motor Company, Dearborn, Mich.

[21] Appl. No.: 120,048

[22] Filed: Nov. 13, 1987

[51] Int. Cl.⁴ .............................................. B60R 19/02
[52] U.S. Cl. .................................... 293/115; 180/68.6
[58] Field of Search ................ 293/115, 132; 180/68.6

[56] References Cited

U.S. PATENT DOCUMENTS 3,792,889  2/1974  Fuener et al. ...................... 293/115

FOREIGN PATENT DOCUMENTS 34541    4/1981  Japan .
1146222  8/1985  U.S.S.R. .

Primary Examiner—Robert R. Song
Attorney, Agent, or Firm—Daniel M. Stock; Clifford L. Sadler

[57] ABSTRACT

A grill assembly for an automobile is positioned to permit movement of the grill in a substantially horizontal rearward manner as the automobile bumper located forwardly adjacent the grill is stroked under impact. The desired movement is made possible by a four-bar linkage mounting arrangement that is adjustable to facilitate the fitting of the grill with respect to adjacent parts of the body of the vehicle.

13 Claims, 2 Drawing Sheets

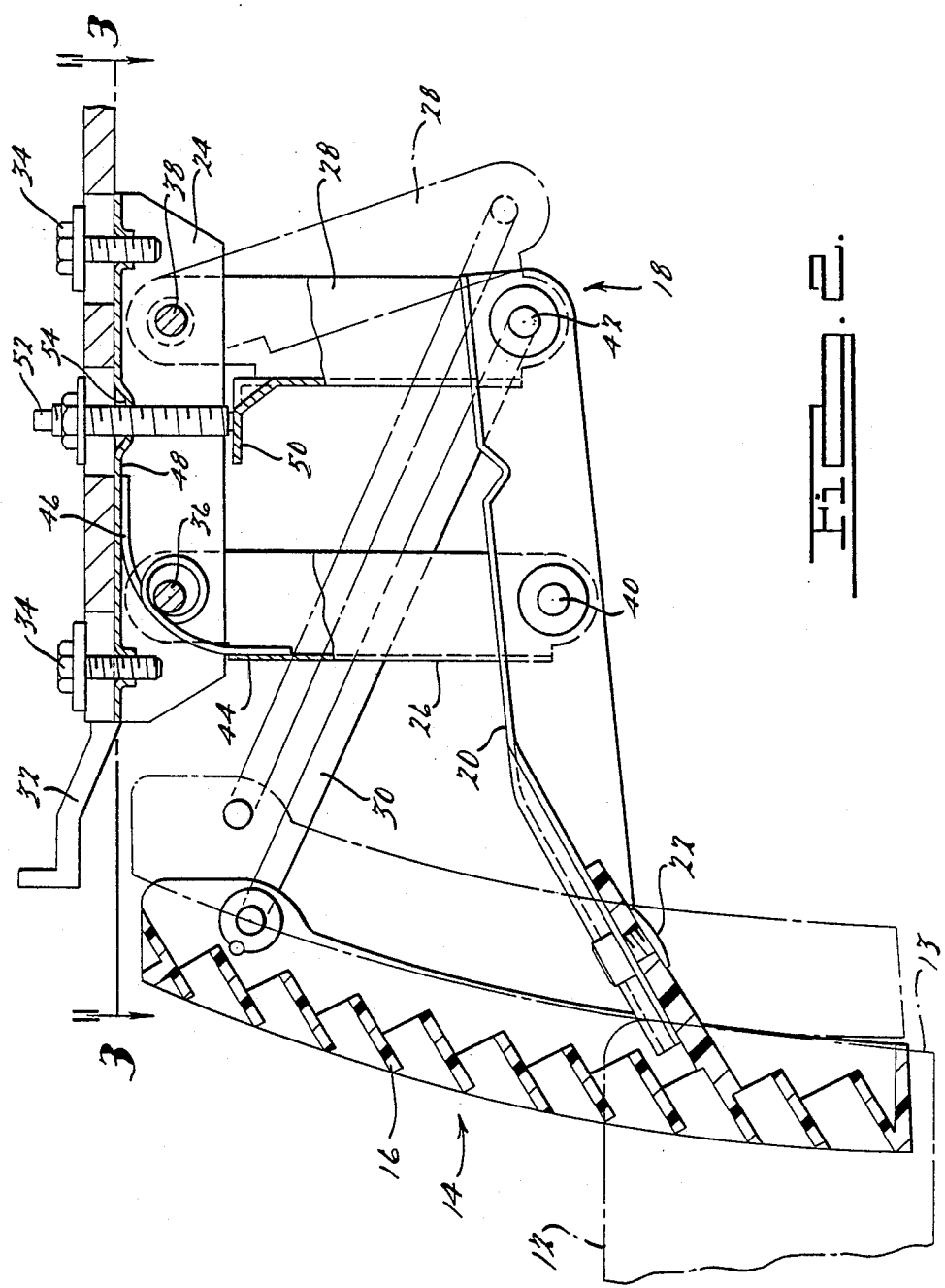

MOVABLE GRILL

BACKGROUND OF THE INVENTION

This invention relates to automotive vehicle grills in general and specifically to movable vehicle grills positioned adjacent energy absorbing bumpers.

It has become the practice in the automobile industry to provide vehicles with energy absorbing bumpers which substantially deflect or move axially with respect to the vehicle upon impact. To avoid damage to the grill work positioned immediately adjacent the rear of such bumpers, it has been necessary to provide sufficient space between the rear of the bumper and the forward surface of the grill to prevent damage. An alternative approach, however, has been to mount the grill to permit its movement upon contact with the rearwardly deflecting or moving bumper. Exemplary of such a design solution is that shown in U.S. Pat. No. 3,792,889, Fuener et al. While this solution is suitable for many vehicle applications, it suffers from the drawback that the grill is pivotally mounted at one end with respect to some fixed portion of the vehicle. Since the height of the grill is generally substantial, this requires providing substantial clearance for the arc through which the free end of the grill passes. As the packaging of components to efficiently define modern automobiles has progressed, it has been found that providing this clearance can in some applications dictate severe design constraints.

SUMMARY OF THE INVENTION

It is accordingly an object of the present invention to provide a movable grill structure for an automotive vehicle which eliminates the arcuate package constraint of the pivotally mounted grill of the prior art.

According to one feature of the present invention, a movable grill is provided which is suspended from a hanger mechanism through a pair of suspended links with a connecting link to define a four-bar linkage arrangement producing substantially axial movement of the grill rearwardly upon contact with the rearward moving bumper.

According to another feature of the invention, mounting adjustment means are carried with the movable grill to provide adjustably accurate positioning of the grill with respect to the associated body components of the vehicle.

BRIEF DESCRIPTION OF THE DRAWINGS

These and other objects and features of the present invention become apparent to those skilled in the automotive grill design arts upon reading the following description with reference to the accompanying drawings in which:

FIG. 2 is a cross-sectional view of one side of the mounting structure of the grill of the present invention.

DESCRIPTION OF THE PREFERRED EMBODIMENT

Figure 1:
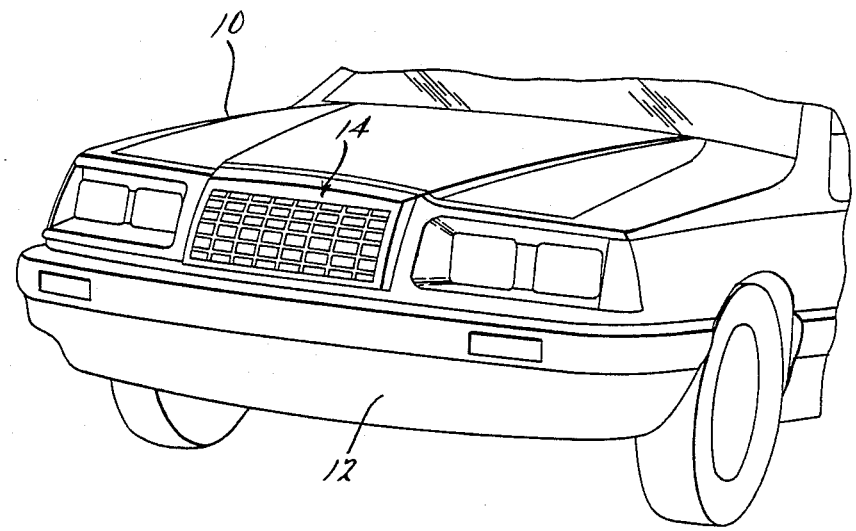
FIG. 1 is a front perspective view of an automobile having an energy absorbing bumper with a movable grill positioned adjacent thereto.
Figure 3:
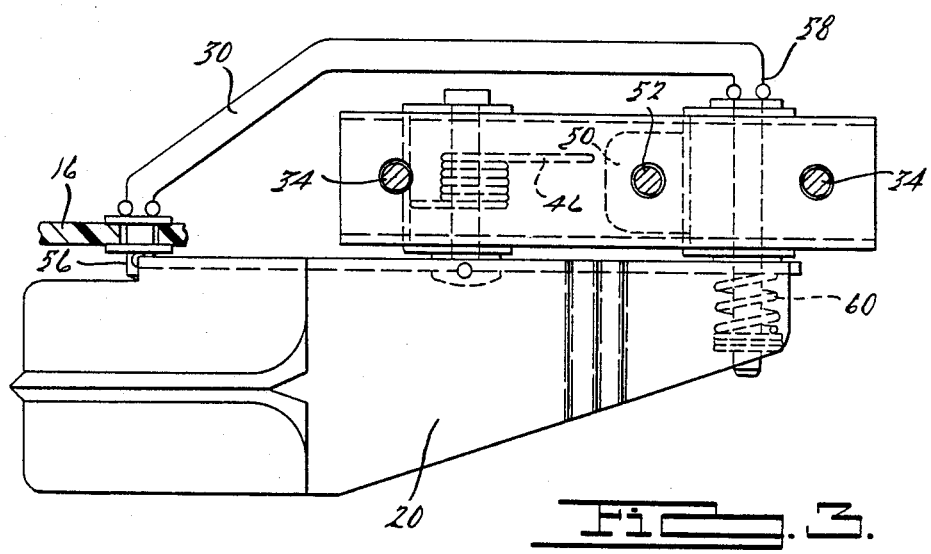
FIG. 3 is a cross-sectional view illustrating the stroking operation of the grill of the present invention.

Turning now to the drawings and in particular to FIG. 1 thereof, a vehicle 10 is illustrated as including an energy absorbing bumper 12 and a movable grill assembly 14 positioned adjacent the bumper 12 longitudinally behind it with respect to the vehicle 10.

Turning now to FIG. 2, the movable grill assembly 14 consists essentially of a decorative grill portion such as indicated at 16 and and a stroking assembly indicated generally at 18. A mounting bracket 20 connects the grill portion 16 to the stroking assembly 18 by means of a suitable fastener such as indicated at 22. The stroking assembly 18 comprises essentially a pair of hanger brackets 24 positioned on each lateral side of the grill. (As the description progresses, it should be understood that the description will be directed at the portion of the stroking mechanism on one side of the vehicle only, the other side being substantially identical and symmetrically positioned.) It further comprises a forward suspended link 26, a rear suspended link 28 and a guiding rod 30.

The hanger 24 is fixedly secured to a portion of the vehicle body as indicated at 32 through suitable fasteners such as bolts shown at 34. The upper end of each of the forward and rear links 26, 28 are pivotally mounted as by pins 36, 38 to the hanger while the lower end of the links 26, 28 are pivotally connected as to the mounting bracket 20 as indicated at 40, 42. The forward link 26 includes a bent-over seat portion as indicated at 44 for supporting one end of coil spring 46 whose other end is grounded against an inner surface 48 of the hanger 24.

The rear link 28 has formed thereon an adjusting seat portion 50 for abutting engagement with an adjusting screw 52 which is threadably engageable in an aperture 54 formed through the hanger 24.

The guide rod 30 extends between the decorative grill portion 16 and the lower pivotal connection 42 of rear arm 28. It includes a forward arm tab portion 56, through which pivotal connection is effected with the decorative grill portion 16, and a rear arm tab portion 58 which is pivotally connected to the mounting bracket 20 through a spring loaded connection as indicated at 60.

OPERATION OF THE PREFERRED EMBODIMENT

Upon frontal impact of the vehicle 10 at low speed, the bumper 12 strokes rearwardly in a manner well known in the art toward the position shown in phantom in FIG. 2. As rear surfaces 13 of the bumper 12 contact the decorative grill portion 16, the grill strokes substantially longitudinally rearwardly as indicated in the position shown in phantom in FIG. 2. The motion of the decorative grill portion 16 is guided by the pivotally connected guide rod 30 interconnecting the upper portion of the decorative grill portion 16 and the lower end of the rear link 28. The cooperation of the suspended forward and rear links 26, 28 with the fixed hanger 24 and the mounting bracket 20 effects parallelogram movement of the stroking device 18 so that the rise of the decorative grill portion 16 with rearward movement may be minimized by the appropriate sizing and spacing of the links 26, 28.

As the links 26, 28 swing counterclockwise as shown in FIG. 2, the coil spring 46 is wound up storing energy for restoral of the decorative grill portion 16 to its assembled position shown in full line in FIG. 2. This will occur upon forward movement of the bumper 12 out of contact with the decorative grill portion 16.

It will be appreciated that the adjusting screw 52 may be utilized to set the assembled position of the decorative portion 16 in that the cooperation of the adjusting screw 52 with the adjusting seat 50 can effect parallelogram movement of the stoking assembly 18 to position the decorative grill portion 16 as desired. If a pair of adjusting screws such as 52 are used, one associated with each hanger 24 on the movable grill assembly 14, good grill conformance to associated body surfaces can be achieved even if there is a slight lack of symmetry across the lateral extend of the grill.

While only one embodiment of the grill assembly has been here described, others are possible without departing from the scope of the appended claims.

I claim:

1. In a vehicle including a bumper movable longitudinally of the vehicle body between an assembled position and a stroked position to absorb energy upon impact of the vehicle bumper with a resisting object and a grill assembly positioned rearwardly adjacent the movable bumper, an improved mounting arrangement for the grill assembly comprising:
   hanger means fixedly secured to a portion of the vehicle body;
   mounting bracket means fixedly connected to the grill assembly; and
   a stroking assembly comprising first and second longitudinally spaced links, each being pivotally mounted at its upper end to said hanger means and at its lower end to said mounting bracket, said stroking assembly including means operative to permit substantially horizontal rearward movement of the grill assembly upon contact with the movable bumper assembly.

2. An improved mounting assembly as defined in claim 1 and further comprising resilient means for biasing the grill toward said forward assembled position rearwardly adjacent said bumper.

3. An improved mounting assembly as defined in claim 1 and further comprising spring means interposed between one of said links and said hanger assembly.

4. An improved mounting assembly as defined in claim 1 and further comprising adjusting means carried on the hanger means engageable with one of said links to effect pivotal movement thereof with respect to the hanger means.

5. An improved mounting assembly as defined in claim 1 and further comprising adjustment screw means threadedly engageable with said hanger means and abuttingly engageable with portions of one of said links to effect pivotal movement of said links through through threadedly engageable adjustment of said screw.

6. An improved mounting assembly as defined in claim 1 and further comprising guide rod means pivotally interconnected at one end to said grill assembly and at the other end to the lower end of one of said links, said guide rod means including means for effecting said pivotal connection between said link lower end and said mounting bracket.

7. An improved mounting assembly as defined in claim 2 and further comprising guide rod means pivotally interconnected at one end to said grill assembly and at the other end to the lower end of one of said links, said guide rod means including means for effecting said pivotal connection between said link lower end and said mounting bracket.

8. In a vehicle including a bumper movable longitudinally of the vehicle body between an assembled position and a stroked position to absorb energy upon impact of the vehicle bumper with a resisting object and a grill assembly positioned rearwardly adjacent the movable bumper, an improved mounting arrangement for the grill assembly comprising:
   hanger means fixedly secured to a portion of the vehicle body;
   mounting bracket means fixedly connected to the grill assembly; and
   a stroking assembly operatively connected between the hanger means and the mounting bracket means, said stroking assembly comprising first and second longitudinally spaced links, each being pivotally mounted at its upper end to said hanger means and at its lower end to said mounting bracket and operative to permit substantially horizontal rearward movement of the grill assembly upon contact with the movable bumper assembly.

9. An improved mounting assembly as defined in claim 8 and further comprising:
   means defining a seat on one of said links; and
   a coil spring engaged between said seat and said hanger assembly and operative to pivotally urge said link toward a position corresponding to said grill assembly assembled position.

10. An improved mounting assembly as defined in claim 8 and further comprising guide rod means pivotally interconnected at one end to said grill assembly and at the other end to the lower end of one of said links, said guide rod means including means for effecting said pivotal connection between said link lower end and said mounting brackets.

11. An improved mounting assembly as defined in claim 9 and further comprising guide rod means pivotally interconnected at one end to said grill assembly and at the other end to the lower end of one of said links, said guide rod means including means for effecting said pivotal connection between said link lower end and said mounting bracket.

12. In a vehicle including a bumper movable longitudinally of the vehicle body between an assembled position and a stroked position to absorb energy upon impact of the vehicle bumper with a resisting object and a grill assembly positioned rearwardly adjacent the movable bumper, an improved mounting arrangement for the grill assembly comprising:
   hanger means fixedly secured to a portion of the vehicle body;
   mounting bracket means fixedly connected to the grill assembly; and
   a stroking assembly operatively connected between the hanger means and the mounting bracket means, said stroking assembly comprising first and second longitudinally spaced links of equal length, each being pivotally mounted at its upper end to said hanger means and at its lower end to said mounting bracket and operative to permit substantially horizontal rearward movement of the grill assembly upon contact with the movable bumper assembly and a guide rod pivotally attached at one end to said grill assembly and at its other end to the lower end of one of said links.

13. An improved mounting assembly as defined in claim 12 wherein said guide rod includes means for effecting the pivotal connection between the link lower end and said mounting bracket.

* * * * *